(12) United States Patent
Pleshachkov et al.

(10) Patent No.: US 10,685,014 B1
(45) Date of Patent: Jun. 16, 2020

(54) METHOD OF SHARING READ-ONLY DATA PAGES AMONG TRANSACTIONS IN A DATABASE MANAGEMENT SYSTEM

(71) Applicant: EMC IP Holding Company LLC, Hopkinton, MA (US)

(72) Inventors: Petr Olegovich Pleshachkov, Nootdorp (NL); Valery Maltsev, Delft (NL)

(73) Assignee: EMC IP Holding Company LLC, Hopkinton, MA (US)

( * ) Notice: Subject to any disclaimer, the term of this patent is extended or adjusted under 35 U.S.C. 154(b) by 345 days.

(21) Appl. No.: 15/281,350

(22) Filed: Sep. 30, 2016

(51) Int. Cl.
*G06F 16/23* (2019.01)
*G06F 3/06* (2006.01)
*G06F 12/0875* (2016.01)
*G06F 16/958* (2019.01)

(52) U.S. Cl.
CPC .......... *G06F 16/2379* (2019.01); *G06F 3/061* (2013.01); *G06F 3/064* (2013.01); *G06F 3/0665* (2013.01); *G06F 3/0673* (2013.01); *G06F 12/0875* (2013.01); *G06F 16/2308* (2019.01); *G06F 16/958* (2019.01); *G06F 2212/1016* (2013.01); *G06F 2212/152* (2013.01); *G06F 2212/163* (2013.01)

(58) Field of Classification Search
None
See application file for complete search history.

(56) References Cited

U.S. PATENT DOCUMENTS

| | | | |
|---|---|---|---|
| 5,701,480 A * | 12/1997 | Raz | G06F 9/466 714/19 |
| 7,822,727 B1 * | 10/2010 | Shaughnessy | G06F 17/30371 707/703 |
| 8,943,282 B1 * | 1/2015 | Armangau | G06F 17/30088 711/126 |
| 2005/0065985 A1 * | 3/2005 | Tummala | G06F 17/30067 |
| 2005/0216462 A1 * | 9/2005 | Xiao | G06F 17/30533 |
| 2008/0162590 A1 * | 7/2008 | Kundu | G06F 11/1471 |
| 2016/0092356 A1 * | 3/2016 | Suman | G06F 12/0873 711/130 |
| 2016/0092488 A1 * | 3/2016 | Sun | G06F 17/30348 707/690 |

OTHER PUBLICATIONS

"Descriptor", Free On-Line Dictionary of Computing, published on Feb. 6, 1998 and accessed online on Jul. 26, 2018 from http://foldoc.org/descriptor (Year: 1998).*
"Disk Space Management and Pages", DBMS Internals, accessed online on Jul. 26, 2018 from http://www.dbmsinternals.com/database-fundamentals/data-storage/disk-space-management-pages/ (Year: 2018).*

* cited by examiner

*Primary Examiner* — Tony Mahmoudi
*Assistant Examiner* — Umar Mian
(74) *Attorney, Agent, or Firm* — Chamberlain, Hrdlicka, White, Williams & Aughtry (57) ABSTRACT

In general, embodiments of the technology relate to a method for processing read-only transactions. The method includes receiving a read-only transaction, wherein the read-only transaction specifies a page, obtaining a page descriptor, from a page cache, for the page, where the page descriptor comprises a plurality of entries, identifying an entry of the plurality of entries in the page descriptor for the read-only transaction, and processing the read-only transaction using a snapshot of the page associated with the entry.

15 Claims, 8 Drawing Sheets

METHOD OF SHARING READ-ONLY DATA PAGES AMONG TRANSACTIONS IN A DATABASE MANAGEMENT SYSTEM

BACKGROUND

Database systems typically handle multiple concurrent transactions. Transaction contention in such systems often results in poor and/or sub-optimal performance of the database system.

DETAILED DESCRIPTION

Specific embodiments of the technology will now be described in detail with reference to the accompanying figures. In the following detailed description of embodiments of the technology, numerous specific details are set forth in order to provide a more thorough understanding of the technology. However, it will be apparent to one of ordinary skill in the art that the technology may be practiced without these specific details. In other instances, well-known features have not been described in detail to avoid unnecessarily complicating the description.

In the following description of FIGS. 1-7, any component described with regard to a figure, in various embodiments of the technology, may be equivalent to one or more like-named components described with regard to any other figure. For brevity, descriptions of these components will not be repeated with regard to each figure. Thus, each and every embodiment of the components of each figure is incorporated by reference and assumed to be optionally present within every other figure having one or more like-named components. Additionally, in accordance with various embodiments of the technology, any description of the components of a figure is to be interpreted as an optional embodiment, which may be implemented in addition to, in conjunction with, or in place of the embodiments described with regard to a corresponding like-named component in any other figure.

In general, embodiments of the technology relate to a method and system for sharing a snapshot between different read-only transactions. More specifically, a page descriptor is introduced to hold the information about all modifications performed on a page by read-write transactions and to keep references to the existing read-only snapshots. When a read-only transaction is processed, an initial determination is made about whether there is an existing page descriptor for the page. If such a page descriptor exists, then a determination is made about whether there is an existing page snapshot referenced by the page descriptor. If such a snapshot exists, then the page snapshot is accessed and shared by the read-only transaction; otherwise, a new page snapshot is created and referenced by the page descriptor for future use and sharing with other read-only transactions.

Figure 1:
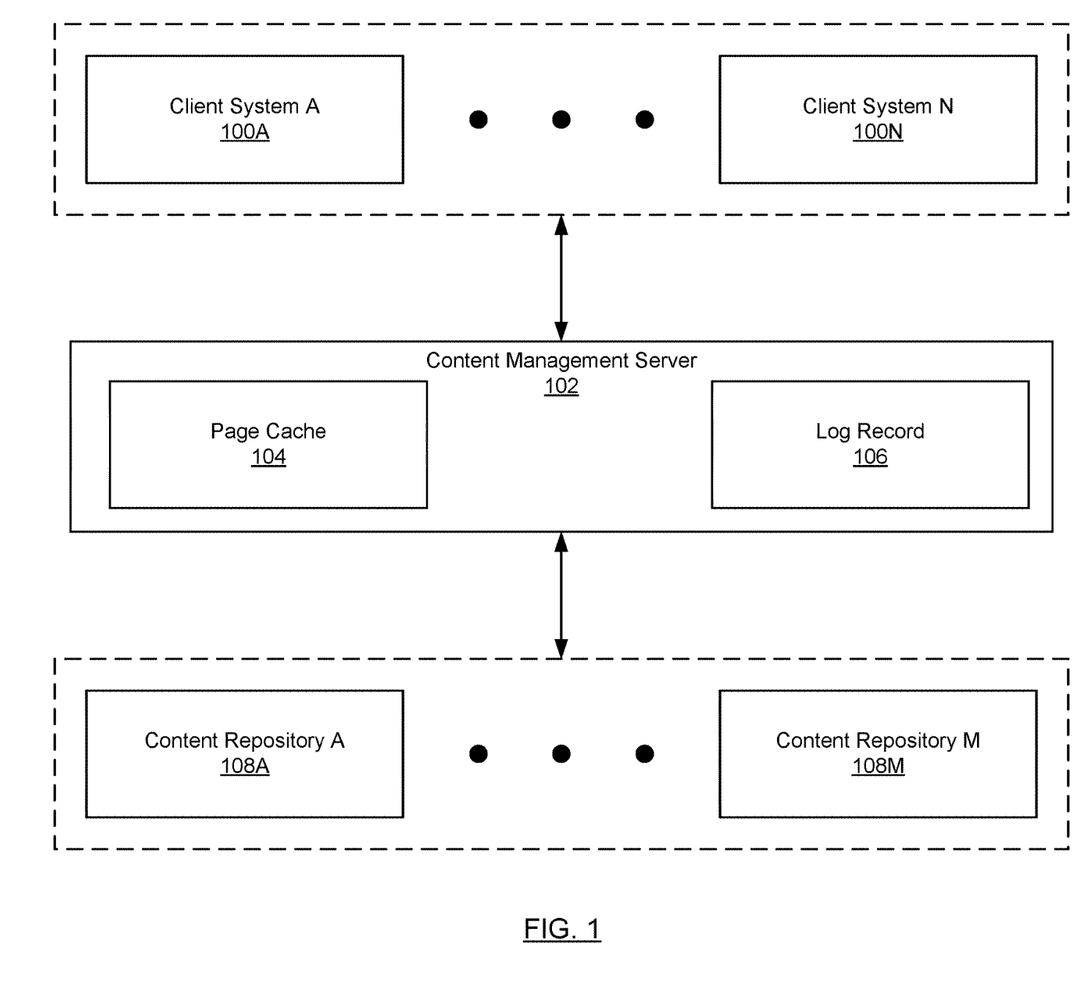
FIG. 1 shows an exemplary system in accordance with one or more embodiments of the technology.

FIG. 1 shows an exemplary system in accordance with one or more embodiments of the technology. The system includes one or more client systems (100A, 100N), a content management service (102) with page cache (104) and log record (106), and one or more content repositories (108A, 108M). The aforementioned components may communicate with each other using any known or later discovered communication protocol. Further, the aforementioned components may communicate using any combination of wired and/or wireless connections and wired and/or wireless networks. Each of the aforementioned components is described below.

In one embodiment of the technology, a client system corresponds to any computing system (see e.g., FIG. 7) that includes functionality to issue requests (also referred to as queries) to the content management service (102) and to receive a corresponding response(s) from the content management service after the request has been serviced.

Continuing with the discussion of FIG. 1, the content management service includes functionality to perform all or a portion of the methods shown in FIGS. 3-6E. The content management service may also include functionality to perform various actions (e.g., read, write, delete, modify, send, etc.) on the data stored in the content repositories when servicing requests from the client systems (see e.g., FIGS. 3-6E).

Figure 6A:
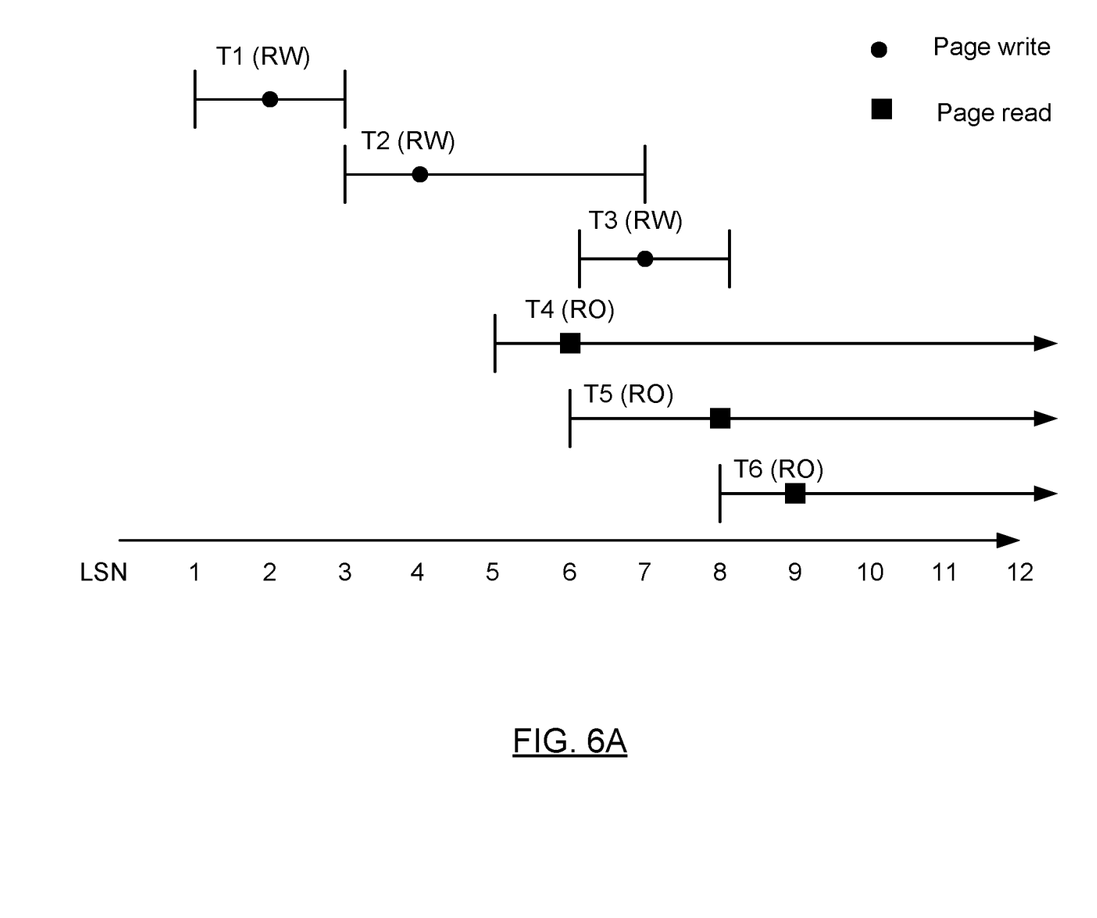
FIGS. 6A-6E show an example in accordance with one or more embodiments of the technology.
Figure 6B:
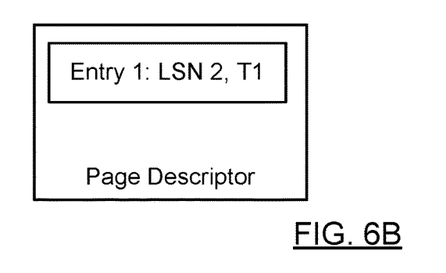
Figure 6C:
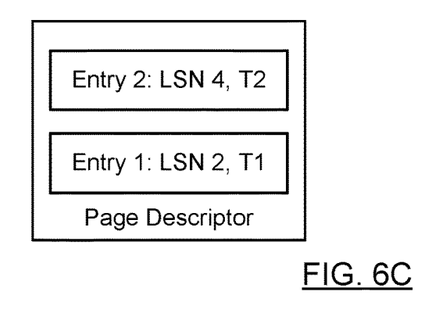
Figure 6D:
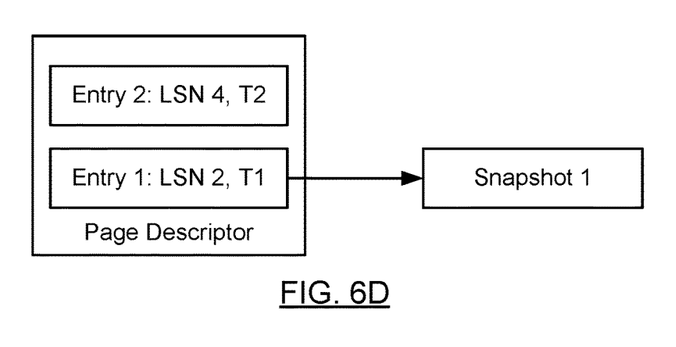
Figure 6E:
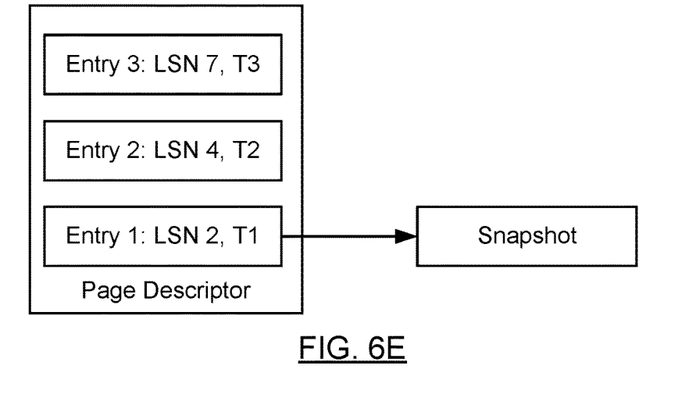
Figure 7:
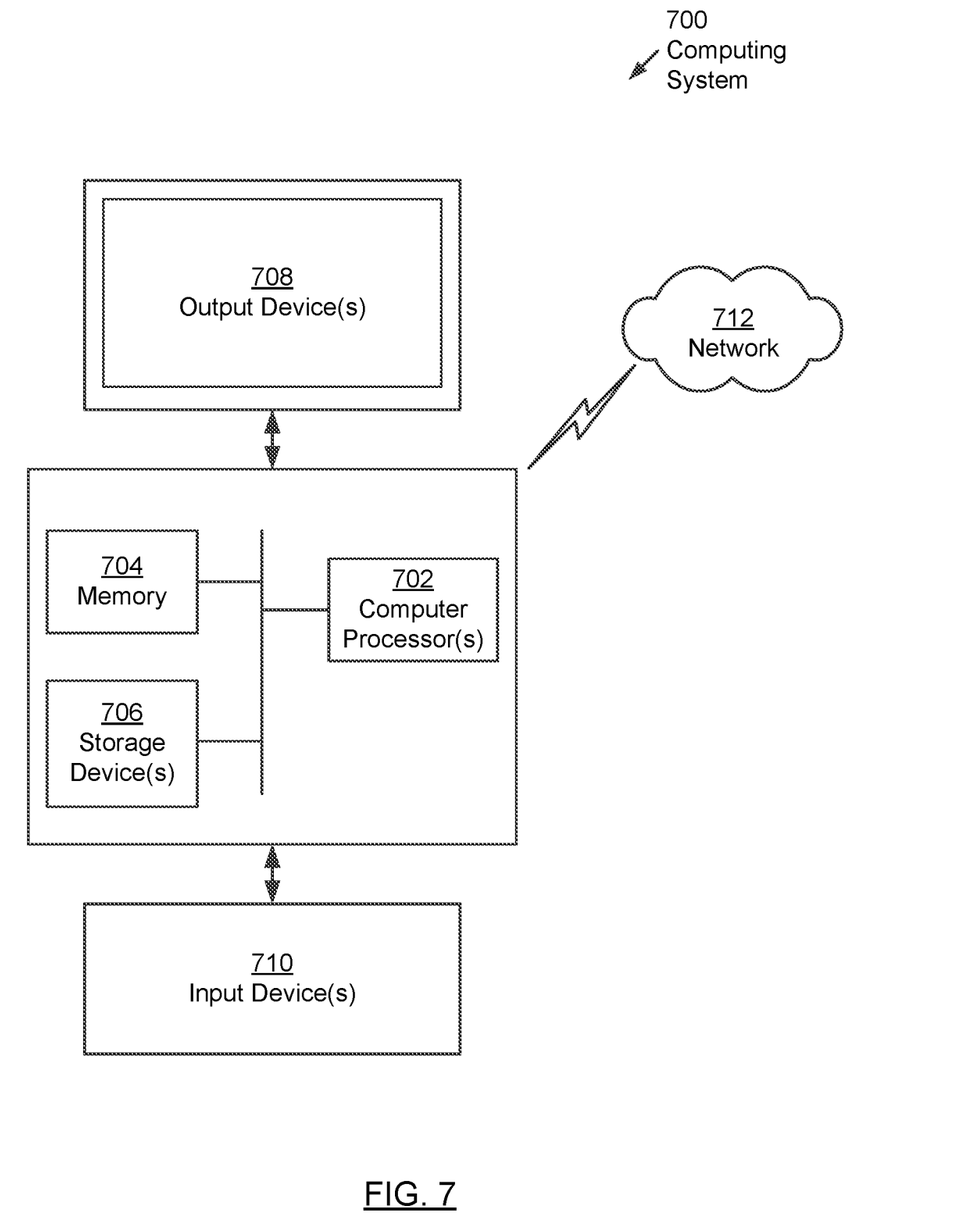
FIG. 7 shows a computing system in accordance with one or more embodiments of the technology.

The content management service may be implemented using one or more computing systems (see e.g., FIG. 7). Additional detail about the operation of the content management service is provided in FIGS. 3-6E.

In one embodiment of the technology, each content repository (108A, 108M) includes persistent storage (e.g., solid state storage, magnetic storage, optical storage, any other type of persistent storage or any combination thereof) in which pages are stored.

Continuing with the discussion of the content repositories, each of the content repositories may store pages (also referred to as data pages) using any known or subsequently discovered mechanism. The following describes various examples of the mechanisms that may be used to store pages. The examples are not intended to limit the technology. In a first example, the content repository (108A, 108M) may be a set of magnetic hard disks. In a second example, the content repository (108A, 108M) may be implemented using a computer cluster that is executing a distributed file system. In a third example, the content repository (108A, 108M) may be implemented using a network file server and one or more block-storage devices (i.e., as a Storage Area Network).

In one embodiment of the technology, content management service receives requests from one or more client systems (100A, 100N). When the received request is a read-write transaction which modifies a page, the content management service creates a log record (106) reflecting the modification. The log record includes information that may be used to identify the page that was modified (e.g., a page ID), a log sequence number (LSN) (which uniquely identifies the log record), and information about the transaction that caused the modification (e.g., a transaction ID). The log record may include additional and/or different information without departing from the technology. The page cache (104) includes one or more page descriptors, one or more master pages, and zero, one or more snapshots. In one embodiment of the technology, the master page (214 in FIG. 2) corresponds to the current version of the page (including all modifications that have been made on the page regardless of whether the modifications have been committed). Accordingly, at any given time, there is only one master page for a given page in the cache; however, there may be multiple snapshots for the page. In one embodiment of the technology each page descriptor is associated with its own master page (214). Additional detail about the page cache is shown in FIG. 2.

The technology is not limited to the architecture of the system shown in FIG. 1.

Figure 2:
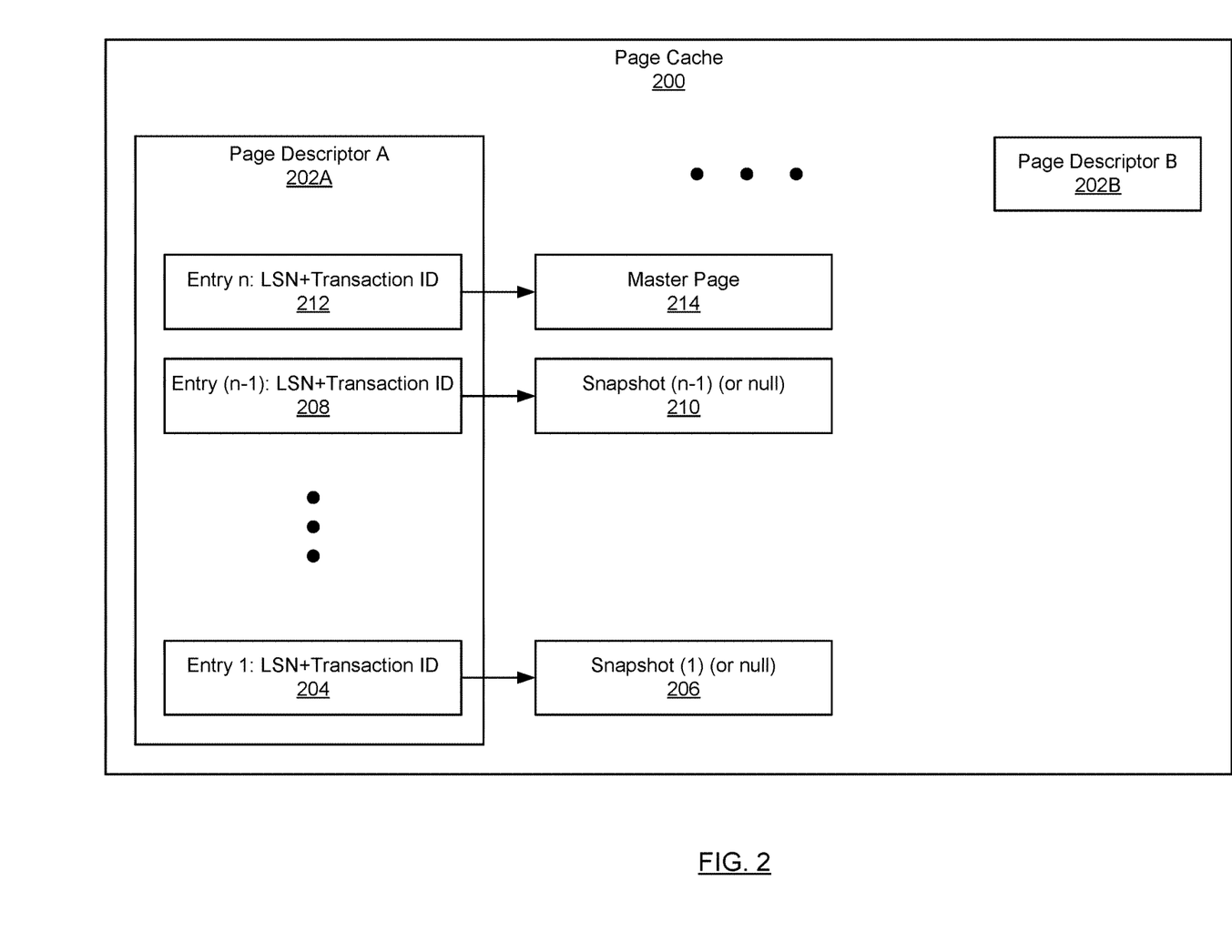
FIG. 2 shows an exemplary page cache in accordance with one or more embodiments of the technology.

FIG. 2 shows an exemplary page cache in accordance with one or more embodiments of the technology. The page cache (200) includes one or more page descriptors (202A, 202B). Each page descriptor is associated with a page (i.e., a page obtained from a content repository). The page descriptor includes one or more entries (204, 208, 212) where each entry includes a LSN and a transaction ID. Further, each entry may include a reference to a snapshot of the page (i.e., the state of the page at the LSN) (206, 210). In some scenarios, the entries are not associated with a snapshot.

In one or more embodiments of the technology, the entries for a given page may be generated in accordance with FIG. 3 below. However, when the entries are initially generated they may not include any reference to a snapshot. Subsequently, an entry may be associated with a snapshot in accordance with the method shown in FIG. 5.

When there are multiple read-write transactions for one page, the corresponding page descriptor (e.g., page descriptor A) will have multiple entries (e.g., entry 1 . . . entry n). The page reflecting the latest modification (212) is master page (214). The entries corresponding to the previous read-write transactions (204, 208) have references to snapshots (206, 210), if such snapshots have been constructed.

In one embodiment of the technology, old snapshots may be evicted from the page cache, e.g., when additional space is required in the page cache to store newer snapshots. When a snapshot is evicted from the page cache, a reference to the now-evicted snapshot is removed from the associated entry in the page descriptor. If necessary, the page descriptor may be subsequently compacted by removing (starting with the oldest entry) any entry that does not reference a page snapshot. If the compacting of the page descriptor results in a no entries remaining in the page descriptor, then the page descriptor is also removed from the page cache.

Figure 3:
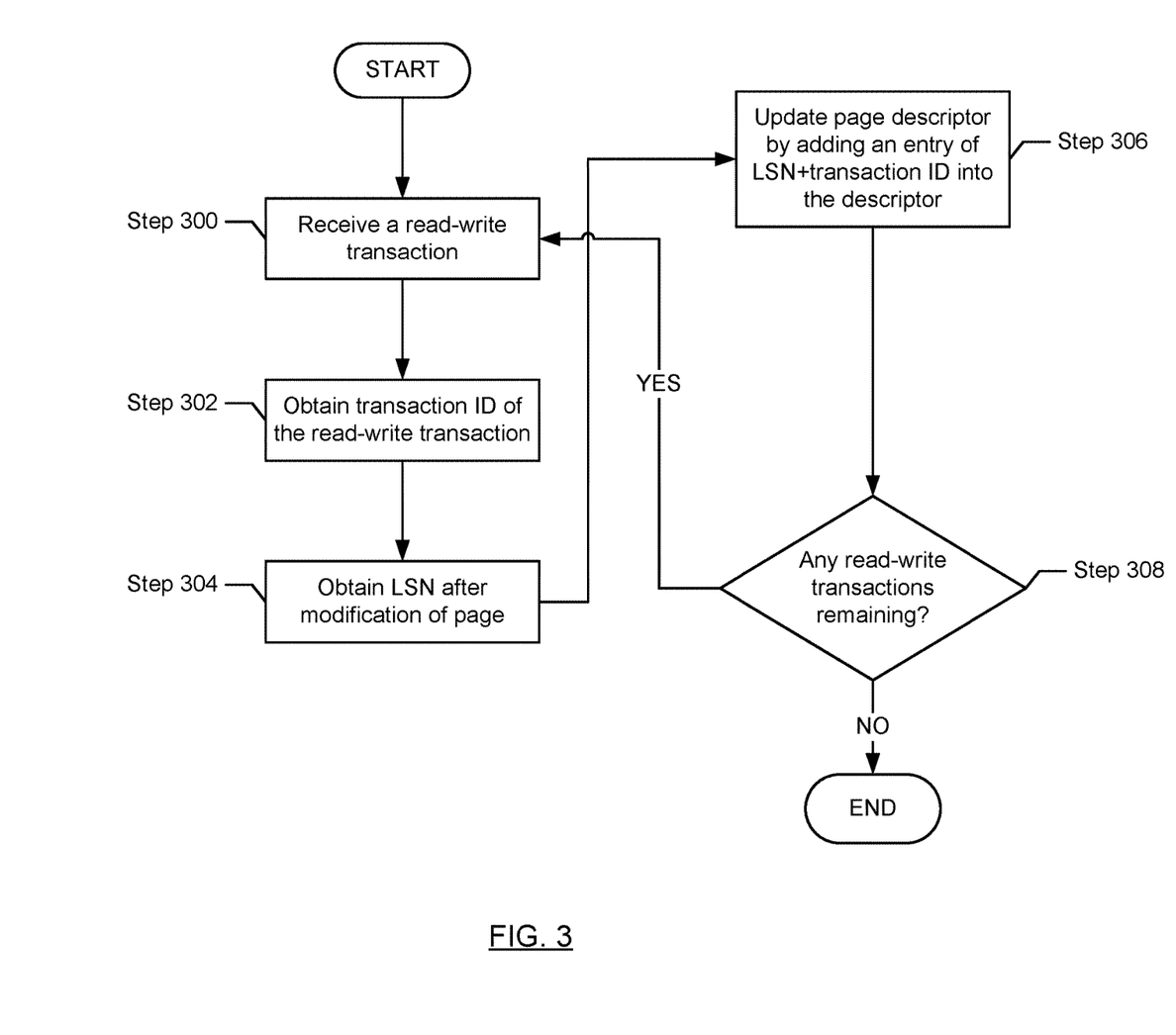
FIG. 3 shows a flowchart for updating page descriptors for read-write transactions in accordance with one or more embodiments of the technology.
Figure 4:
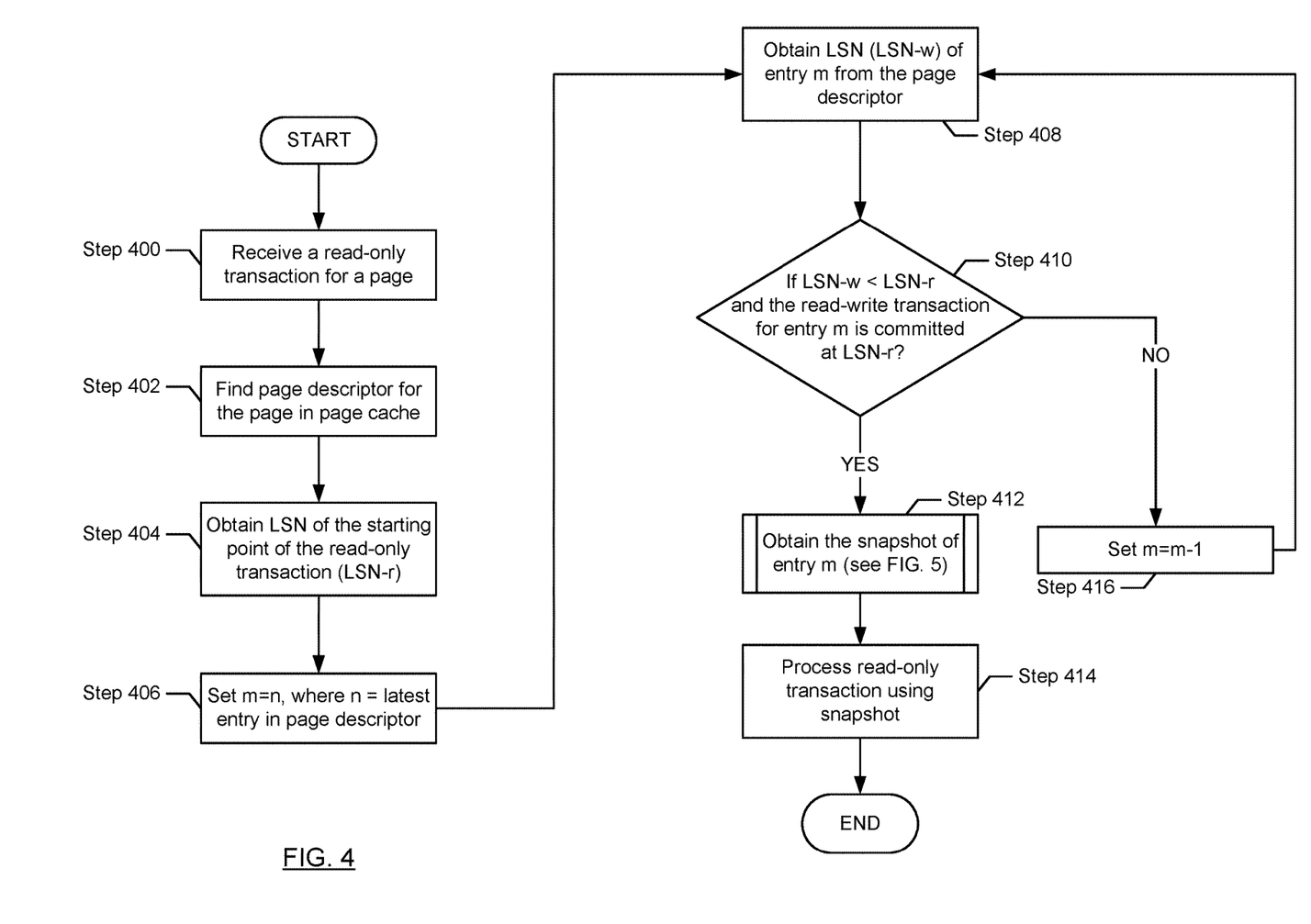
FIG. 4 shows a flowchart for processing read-only transaction in accordance with one or more embodiments of the technology.
Figure 5:
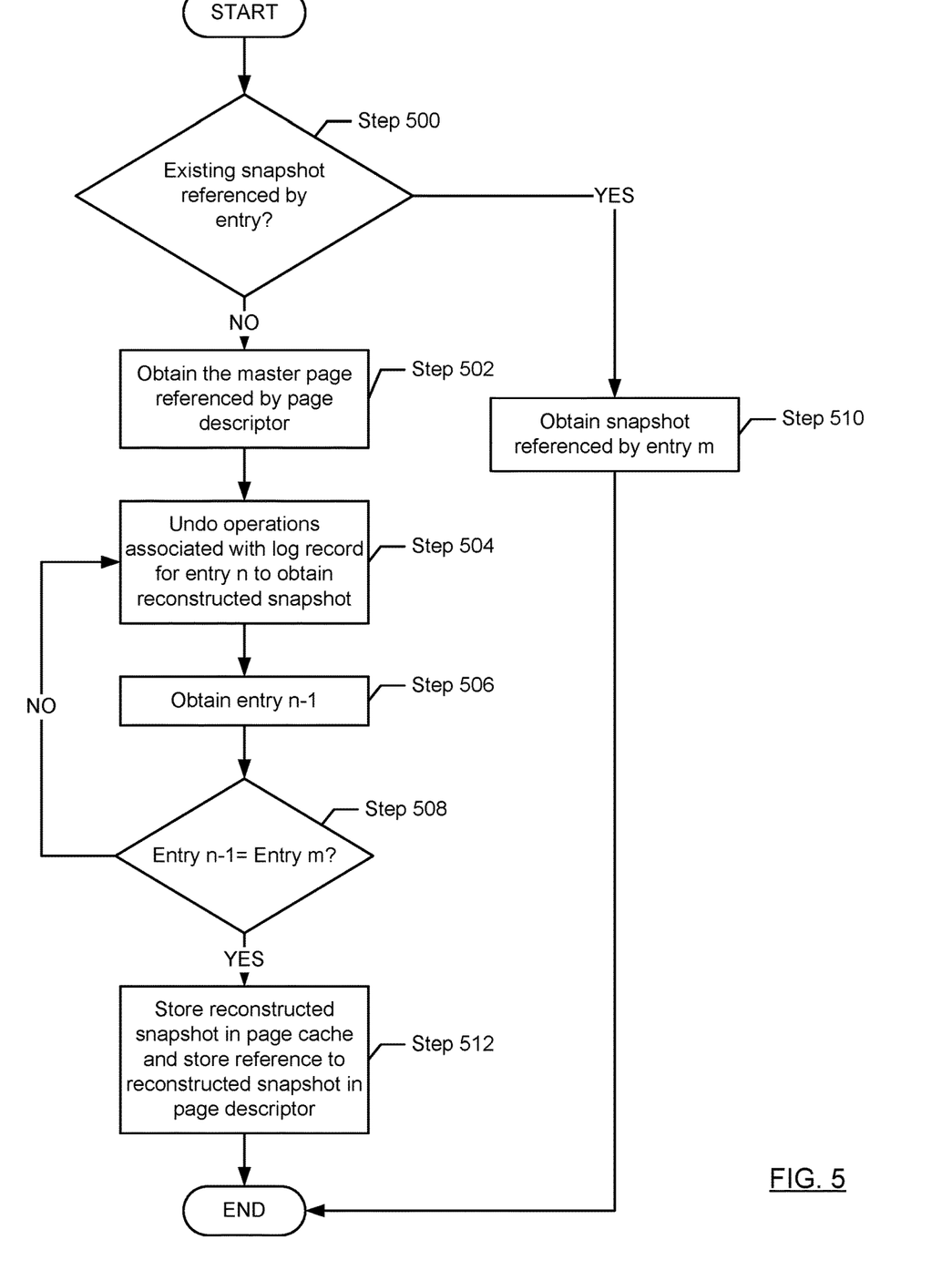
FIG. 5 shows a flowchart for obtaining the snapshot in accordance with one or more embodiments of the technology.

FIGS. 3-5 show flowcharts in accordance with one or more embodiments of the technology. While the various steps in these flowcharts are presented and described sequentially, one of ordinary skill in the art will appreciate that some or all of the steps may be executed in different orders, may be combined or omitted, and some or all of the steps may be executed in parallel. Furthermore, the steps may be performed actively or passively.

FIG. 3 shows a flowchart for updating page descriptors for read-write transactions in accordance with one or more embodiments of the technology.

In step 300, a read-write transaction for a page is received from a client system.

In step 302, the transaction ID of the read-write transaction is obtained.

In step 304, once the page has been modified pursuant to the read-write transaction. The LSN may be assigned, for example, by the content management service. The LSN may be obtained prior to the transaction (i.e., the read-write transaction in step 300) being committed. In one embodiment of the technology, the modification of the page may also trigger the creation of a log record which tracks that the page was modified. The log record creation may be performed by a process other than the process that is performing the read-write transaction.

In step 306, an entry including the LSN obtained from step 304 and the transaction ID obtained from step 302 is created and added into the page descriptor associated with the modified page.

In step 308, a determination is made about whether there are any read-write transactions remaining. If there are remaining read-write transactions, the process proceeds to step 300; otherwise, all of the read-write transactions have been processed, the process ends or otherwise the content management service awaits receipt of additional read-write transactions.

FIG. 4 shows a flowchart for processing read-only transaction in accordance with one or more embodiments of the technology.

In step 400, a read-only transaction for a page is received. The client system may issue a read-only transaction requesting a certain page.

In step 402, the page descriptor corresponding to the requested page of the read-only transaction is located in the page cache. If there is no page descriptor for the requested page, then a corresponding page descriptor will be created. Once the page descriptor is created, another process may add one or more entries to the newly created page descriptor using one or more log records. In one embodiment of the technology, if the page descriptor exists but does not include entries that include LSNs which can be used to perform the method shown in FIGS. 4 and 5, then additional entries may also be created and added to the page descriptor. In such scenarios, the page may be locked to prevent modifications to the page while the page descriptor and any corresponding snapshots are being created.

In step 404, an LSN corresponding to the starting point of the read-only transaction is obtained. The LSN obtained in step 404 is hereafter denoted as LSN-r. The LSN obtained in step 404 corresponds to the LSN that would be generated if a page had been modified when the read-only transaction was received by the content management service.

In step 406, a variable m is set to n, where n is the newest entry in the page descriptor (i.e., the entry with the highest LSN in the page descriptor). In one embodiment of the technology, the entry with the highest LSN points to the master page (see e.g., FIG. 2).

In step 408, the LSN of the entry m is obtained from the page descriptor. For purposes of the following discussion, LSN-w corresponds to the LSN obtained from entry m in the page descriptor.

In step 410, a determination is made about whether the following two conditions are satisfied: i) LSN-w<LSN-r and ii) the read-write transaction for entry m is committed before LSN-r. The conditions may be collectively referred to as "undo conditions". Specifically, the first condition checks whether the write operation occurred prior to the read-only transaction beginning. All the modifications happened later than this would need to be undone. In other words, all log records with LSN greater than or equal to the LSN-r would need to be undone in order to obtain a page that corresponds to the state of the page that the read-only transaction intended to read. When the first condition is met, the second condition is checked. The second condition is used to determine if the read-write transaction that generated the entry associated with LSN-w was committed prior to the read-only transaction beginning. If both of the conditions are met, the process proceeds to step 412; otherwise, the process proceeds to step 416. In step 416, m=m−1 and then the process proceeds to step 408.

In step 412, the snapshot of the entry that satisfies both conditions in step 410 is obtained. If the entry includes a reference to the snapshot, the referenced snapshot is obtained; otherwise, the snapshot is generated. Additional details about the step 412 are provided in FIG. 5. In step 414, the read-only transaction is processed by using the obtained snapshot.

FIG. 5 shows a flowchart for obtaining the snapshot in accordance with one or more embodiments of the technology.

In step 500, a determination is made about whether there is an existing snapshot referenced by the entry (i.e., entry m obtained in FIG. 4). If there is an existing snapshot, the process proceeds to step 510; otherwise, the process proceeds to step 502 in order to reconstruct the snapshot.

In step 510, the snapshot referenced by entry m is directly obtained from the page cache. In one embodiment of the technology, obtaining the snapshot includes accessing (or providing access to) the snapshot such that it may be used to service a read-only transaction. The process then ends.

Returning to step 502, in step 502, the master page corresponding to the page associated with the page descriptor is obtained. In step 504, the write operation associated with the newest log record (i.e., log entry n) n is undone (i.e., the changes are removed from the master page) in order to obtain a reconstructed snapshot.

In step 506, entry n−1 from the page descriptor is selected.

In step 508, a determination is made about whether the entry selected in step 506 corresponds to entry m which satisfies the two conditions in step 410. Specifically, LSN-w<LSN-r and the read-write transaction for entry m is committed on or before LSN-r. If the entry selected in step 506 corresponds to entry m, then the process proceeds to step 504; otherwise, the process proceeds to step 512.

In step 512, the reconstructed snapshot is stored in the page cache and a reference to the reconstructed snapshot is stored in the page descriptor. By storing the reconstructed snapshot and reference to the snapshot into page cache, the reconstructed snapshot can be shared by other read-only transactions. Therefore, the method eliminates the possible duplicate reconstructed snapshots of a page constructed by different read-only transactions and requires the log records for the page being undone only once per reconstructed snapshot.

FIGS. 6A-6E show an example in accordance with one or more embodiments of the technology. The example is not intended to limit the scope of the technology. Turning to the example, consider a scenario in which there are three read-write transactions: T1, T2, and T3 and three read-only transaction: T4, T5, and T6. For read-write transactions, the dots represent when a page was modified during the read-write transaction and for read-only transaction, the squares represent when a page was read during the read-only operation.

Each of the aforementioned transactions begins at a different LSN and last for different period of time as shown in FIG. 6A. The page descriptor is updated whenever a new read-write transaction occurs and/or when a reconstructed snapshot is created and stored. The updating process is described below.

At LSN 1, T1 is initiated and at LSN 2 the page is modified. This modification results in the generation of Entry 1 (See FIG. 6B). Entry 1 specifies LSN 2, T1. In addition, though not shown, the master page (which includes the modification made by T1) is stored in the page cache. While the modifications have been made to the page at LSN 2, T1 does not commit these modifications until LSN 3.

At LSN 3, T2 is initiated and at LSN 4 the page is modified. This modification results in the generation of Entry 2 (See FIG. 6C). Entry 2 specifies LSN 4, T2. In addition, though not shown, the master page (which includes the modification made by T1 and T2) is stored in the page cache. While the modifications have been made to the page at LSN 4, T2 does not commit these modifications until LSN 7.

At LSN 5, T4 is initiated and at LSN 6 T4 attempts to read the page. At this stage, the methods shown in FIGS. 4-5 are performed. Specifically, a determination is made about whether there is an entry in the page descriptor that satisfies the following conditions: i) the LSN of entry is less than LSN 5, and ii) the read-write transaction that created the entry in (i) was committed prior to LSN 5. In this example, the first entry that is evaluated is Entry 2. The LSN of Entry 2 is less than LSN 5; however, T2 (which was the transaction that generated Entry 2) was not committed at LSN 5. Accordingly, Entry 2 does not satisfy the two conditions. The process then proceeds to evaluate Entry 1. Entry 1 satisfies the two conditions because the LSN of Entry 1 is less than LSN 5 and T1 was committed prior to LSN 5.

Once it is determined that a snapshot referenced by Entry 1 may be used for T4, a determination is made about whether Entry 1 references a snapshot. In this example, there is no snapshot currently referenced by Entry 1. To reconstruct the snapshot for Entry 1, the master page is obtained and then modifications for all transactions made to the page between LSN 5 and LSN 2 are undone. In this example, the only transaction that modified the page between LSN 5 and LSN 2 is T2. Accordingly, the modifications of T2 are undone from the master page. The result is a reconstructed snapshot that is stored in the page cache and referenced by Entry 1. T4 is subsequently performed using the aforementioned reconstructed snapshot. The state of the page descriptor after the reconstructed snapshot is generated as shown in FIG. 6D.

At LSN 6, T3 is initiated and at LSN 7 the page is modified. This modification results in the generation of Entry 3 (See FIG. 6E). Entry 3 specifies LSN 7, T3. In addition, though not shown, the master page (which includes the modification made by T1, T2 and T3) is stored in the page cache. While the modifications have been made to the page at LSN 7, T3 does not commit these modifications until LSN 8.

Referring to FIG. 6A, at LSN 6, T5 is initiated and at LSN 8 T5 attempts to read the page. At this stage, the methods shown in FIGS. 4-5 are performed. Specifically, a determination is made about whether there is an entry in the page descriptor that satisfies the following conditions: i) the LSN of entry is less than LSN 6, and ii) the read-write transaction that created the entry in (i) was committed prior to LSN 6. In this example, the first entry that is evaluated is Entry 3. The LSN of Entry 3 is greater than LSN 6. Thus, this Entry does not satisfy the conditions. The process then proceeds to Entry 2. The LSN of Entry 2 is 4, which is less than LSN 6; however, T2 (which was the transaction that generated Entry 2) was not committed at LSN 6. Accordingly, Entry 2 does not satisfy the two conditions. The process then proceeds to evaluate Entry 1. Entry 1 satisfies the two conditions because the LSN of Entry 1 is less than LSN 6 and T1 was committed prior to LSN 6.

Once it is determined that a snapshot referenced by Entry 1 may be used for T5, a determination is made about whether Entry 1 references a snapshot. In this example, there is a snapshot referenced by Entry 1 (i.e., the snapshot reconstructed by T5). Accordingly, T5 uses the reconstructed snapshot associated with Entry 1. T4 and T5 may concurrently access the reconstructed snapshot.

Referring to FIG. 6A, at LSN 8, T6 is initiated and at LSN 9 T6 attempts to read the page. Because LSN 8 is greater than the LSN of any of the entries in the page descriptor and because there are no open read-write transactions for the page at LSN 9, T6 may use the master page.

Embodiments of the technology may be implemented on a computing system. Any combination of mobile, desktop, server, embedded, or other types of hardware may be used. For example, as shown in FIG. 7, the computing system (700) may include one or more computer processor(s) (702), associated memory (704) (e.g., random access memory (RAM), cache memory, flash memory, etc.), one or more storage device(s) (706) (e.g., a hard disk, an optical drive such as a compact disk (CD) drive or digital versatile disk (DVD) drive, a flash memory stick, etc.), and numerous other elements and functionalities. The computer processor(s) (702) may be an integrated circuit for processing instructions. For example, the computer processor(s) may be one or more cores, or micro-cores of a processor. The computing system (700) may also include one or more input device(s) (710), such as a touchscreen, keyboard, mouse, microphone, touchpad, electronic pen, or any other type of input device. Further, the computing system (700) may include one or more output device(s) (708), such as a screen (e.g., a liquid crystal display (LCD), a plasma display, touchscreen, cathode ray tube (CRT) monitor, projector, or other display device), a printer, external storage, or any other output device. One or more of the output device(s) may be the same or different from the input device(s). The computing system (700) may be connected to a network (712) (e.g., a local area network (LAN), a wide area network (WAN) such as the Internet, mobile network, or any other type of network) via a network interface connection (not shown). The input and output device(s) may be locally or remotely (e.g., via the network (712)) connected to the computer processor(s) (702), memory (704), and storage device(s) (706). Many different types of computing systems exist, and the aforementioned input and output device(s) may take other forms.

Software instructions in the form of computer readable program code to perform embodiments of the technology may be stored, in whole or in part, temporarily or permanently, on a non-transitory computer readable medium such as a CD, DVD, storage device, a diskette, a tape, flash memory, physical memory, or any other computer readable storage medium. Specifically, the software instructions may correspond to computer readable program code that when executed by a processor(s), is configured to perform embodiments of the technology.

Further, one or more elements of the aforementioned computing system (700) may be located at a remote location and connected to the other elements over a network (714). Further, embodiments of the technology may be implemented on a distributed system having a plurality of nodes, where each portion of the technology may be located on a different node within the distributed system. In one embodiment of the technology, the node corresponds to a distinct computing device. Alternatively, the node may correspond to a computer processor with associated physical memory. The node may alternatively correspond to a computer processor or micro-core of a computer processor with shared memory and/or resources.

While the technology has been described with respect to a limited number of embodiments, those skilled in the art, having benefit of this disclosure, will appreciate that other embodiments can be devised which do not depart from the scope of the technology as disclosed herein. Accordingly, the scope of the technology should be limited only by the attached claims.

What is claimed is:

1. A method for processing read-only transactions, comprising:
   receiving a read-only transaction that specifies a page;
   obtaining, from a page cache, a page descriptor for the page, wherein the page descriptor comprises a plurality of entries, wherein each entry of the plurality of entries comprising a plurality of log sequence numbers (LSNs), respectively;
   identifying, based on the plurality of LSNs and a LSN of the read-only transaction, an entry of the plurality of entries;
   making a first determination that the entry does not comprise an existing reference to an existing snapshot;
   generating, based on the first determination, a new snapshot, wherein generating the new snapshot comprises:
      obtaining a current version of the page;
      identifying a subset of entries, of the plurality of entries, that comprise LSNs greater than the LSN of the read-only transaction;
      reconstructing the new snapshot by sequentially undoing transactions of the current version of the page associated with the subset of entries;
      storing the new snapshot in the page cache; and
      storing a new reference to the new snapshot in the entry;
   after the new snapshot is stored in the page cache:
      processing the read-only transaction using the new snapshot;
      receiving a second read-only transaction, wherein the second read-only transaction specifies the page;
      identifying, based on the plurality of LSNs and a second LSN of the second read-only transaction, the entry of the plurality of entries;
      making a second determination that the entry comprises the new reference to the new snapshot; and
      processing, based on the second determination, the second read-only transaction using the new snapshot.

2. The method of claim 1, further comprising:
   adding a new entry to the page descriptor,
   wherein the new entry is added when a master page is modified by a read-write transaction,
   wherein the new entry comprises:
      a LSN for the read-write transaction; and
      a transaction identifier of the read-write transaction,
   wherein the master page is associated with the page descriptor.

3. The method of claim 1, wherein identifying the entry of the plurality of entries of the page descriptor for the read-only transaction comprises:
   obtaining the LSN for the read-only transaction; and
   determining that the entry is associated with a third LSN where the third LSN is less than the LSN and that a read-write transaction associated with the entry was committed prior to the LSN.

4. The method of claim 1, wherein identifying the entry in the page descriptor for the read-only transaction comprises:
performing sequential processing of each entry of the plurality of entries in the page descriptor until the entry is identified, wherein the sequential processing of the plurality of entries begins with a newest entry of the plurality of entries,
wherein processing each entry of the plurality of entries comprises determining whether each entry satisfies an undo condition.

5. The method of claim 1, wherein the new snapshot is concurrently used to process the read-only transaction and the second read-only transaction.

6. A system, comprising:
a content repository storing a page;
a content management system coupled to the content repository, comprising a processor, memory, and a page cache, wherein the page cache comprises a page descriptor for the page, wherein the page descriptor comprises a plurality of entries;
wherein the memory comprises instructions which, when executed by the processor, perform a method for servicing requests, comprising:
receiving a read-only transaction that specifies the page;
obtaining, from the page cache, the page descriptor for the page, wherein each entry of the plurality of entries comprising a plurality of log sequence numbers (LSNs), respectively;
identifying, based on the plurality of LSNs and a LSN of the read-only transaction, an entry of the plurality of entries;
making a first determination that the entry does not comprise an existing reference to an existing snapshot;
generating, based on the first determination, a new snapshot, wherein generating the new snapshot comprises:
obtaining a current version of the page; identifying a subset of entries, of the plurality of entries, that comprise LSNs greater than the LSN of the read-only transaction;
reconstructing the new snapshot by sequentially undoing transactions of the current version of the page associated with the subset of entries;
storing the new snapshot in the page cache; and
storing a new reference to the new snapshot in the entry;
after the new snapshot is stored in the page cache:
processing the read-only transaction using the new snapshot;
receiving a second read-only transaction, wherein the second read-only transaction specifies the page;
identifying, based on the plurality of LSNs and a second LSN of the second read-only transaction, the entry of the plurality of entries;
making a second determination that the entry comprises the new reference to the new snapshot; and
processing, based on the second determination, the second read-only transaction using the new snapshot.

7. The system of claim 6, wherein the method further comprises:
adding a new entry to the page descriptor,
wherein the new entry is added when a master page is modified by a read-write transaction,
wherein the new entry comprises:
a LSN for the read-write transaction; and
a transaction identifier of the read-write transaction,
wherein the master page is associated with the page descriptor.

8. The system of claim 6, wherein the new snapshot is concurrently used to process the read-only transaction and the second read-only transaction.

9. The system of claim 6, wherein identifying the entry of the plurality of entries of the page descriptor for the read-only transaction comprises:
obtaining the LSN for the read-only transaction; and
determining that the entry is associated with a third LSN where the third LSN is less than the LSN and that a read-write transaction associated with the entry was committed prior to the LSN.

10. The system of claim 6, wherein identifying the entry in the page descriptor for the read-only transaction comprises:
performing sequential processing of each entry of the plurality of entries in the page descriptor until the entry is identified, wherein the sequential processing of the plurality of entries begins with a newest entry of the plurality of entries,
wherein processing each entry of the plurality of entries comprises determining whether each entry satisfies an undo condition.

11. A non-transitory computer readable medium comprising computer readable program code, which when executed by a computer processor enables the computer processor to perform a method for servicing requests, the method comprising:
receiving a read-only transaction that specifies a page;
obtaining, from a page cache, a page descriptor for the page, wherein the page descriptor comprises a plurality of entries, wherein each entry of the plurality of entries comprising a plurality of log sequence numbers (LSNs), respectively;
identifying, based on the plurality of LSNs and a LSN of the read-only transaction, an entry of the plurality of entries;
making a first determination that the entry does not comprise an existing reference to an existing snapshot;
generating, based on the first determination, a new snapshot, wherein generating the new snapshot comprises:
obtaining a current version of the page;
identifying a subset of entries, of the plurality of entries, that comprise LSNs greater than the LSN of the read-only transaction;
reconstructing the new snapshot by sequentially undoing transactions of the current version of the page associated with the subset of entries;
storing the new snapshot in the page cache; and
storing a new reference to the new snapshot in the entry;
after the new snapshot is stored in the page cache:
processing the read-only transaction using the new snapshot;
receiving a second read-only transaction, wherein the second read-only transaction specifies the page;
identifying, based on the plurality of LSNs and a second LSN of the second read-only transaction, the entry of the plurality of entries;
making a second determination that the entry comprises the new reference to the new snapshot; and
processing, based on the second determination, the second read-only transaction using the new snapshot.

12. The non-transitory computer readable medium of claim 11, the method further comprising:
adding a new entry to the page descriptor,
wherein the new entry is added when a master page is modified by a read-write transaction,
wherein the new entry comprises:
a LSN for the read-write transaction; and
a transaction identifier of the read-write transaction,
wherein the master page is associated with the page descriptor.

13. The non-transitory computer readable medium of claim 11, wherein identifying the entry in the page descriptor for the read-only transaction comprises:
obtaining the LSN for the read-only transaction; and
determining that the entry is associated with a third LSN where the third LSN is less than the LSN and that a read-write transaction associated with the entry was committed prior to the LSN.

14. The non-transitory computer readable medium of claim 11, wherein identifying the entry of the plurality of entries of the page descriptor for the read-only transaction comprises:
performing sequential processing of each entry of the plurality of entries in the page descriptor until the entry is identified, wherein the sequential processing of the plurality of entries begins with a newest entry of the plurality of entries,
wherein processing each entry of the plurality of entries comprises determining whether each entry satisfies an undo condition.

15. The non-transitory computer readable medium of claim 11, wherein the new snapshot is concurrently used to process the read-only transaction and the second read-only transaction.

* * * * *